United States Patent [19]

Slater

[11] 3,860,319

[45] Jan. 14, 1975

[54] BOXLESS ELECTRICAL COMPONENT

[76] Inventor: Thomas S. Slater, 62 Litchfield Rd., Port Wash., N.Y. 11050

[22] Filed: Sept. 13, 1973

[21] Appl. No.: 396,707

[52] U.S. Cl. .............................. 339/99 R, 339/14 R
[51] Int. Cl. ............................................. H01r 9/06
[58] Field of Search ............ 339/14, 95, 96, 97, 98, 339/99

[56] References Cited
UNITED STATES PATENTS

| | | | |
|---|---|---|---|
| 3,320,385 | 5/1967 | Sherwood | 339/97 R |
| 3,576,518 | 4/1971 | Bazille et al. | 339/98 |
| 3,723,948 | 3/1973 | Wyatt et al. | 339/99 R |

*Primary Examiner*—Roy D. Frazier
*Assistant Examiner*—Robert A. Hafer
*Attorney, Agent, or Firm*—Morgan, Finnegan, Durham & Pine

[57] ABSTRACT

An electrical component for receiving power cord plugs, fuses or switch means and adapted to be electrically connected to insulated wire conductors carried in a nonmetallic sheathed cable, without preliminary stripping of the insulation, or severing of the wire conductors, or slicing of the cable sheath, or spreading apart of the wire conductors. The cable is set into a groove in the component cap which is pressed into the component body. Cutting and spreading components housed within the body serve to sever the sheathed cable and guide the individual wires within the sheathed cable into their respective channel grooves in the component body to provide electrical contact with terminals associated with each of the wires; all of the above functions being performed during the time in which the cap and component body are pressed together.

11 Claims, 13 Drawing Figures

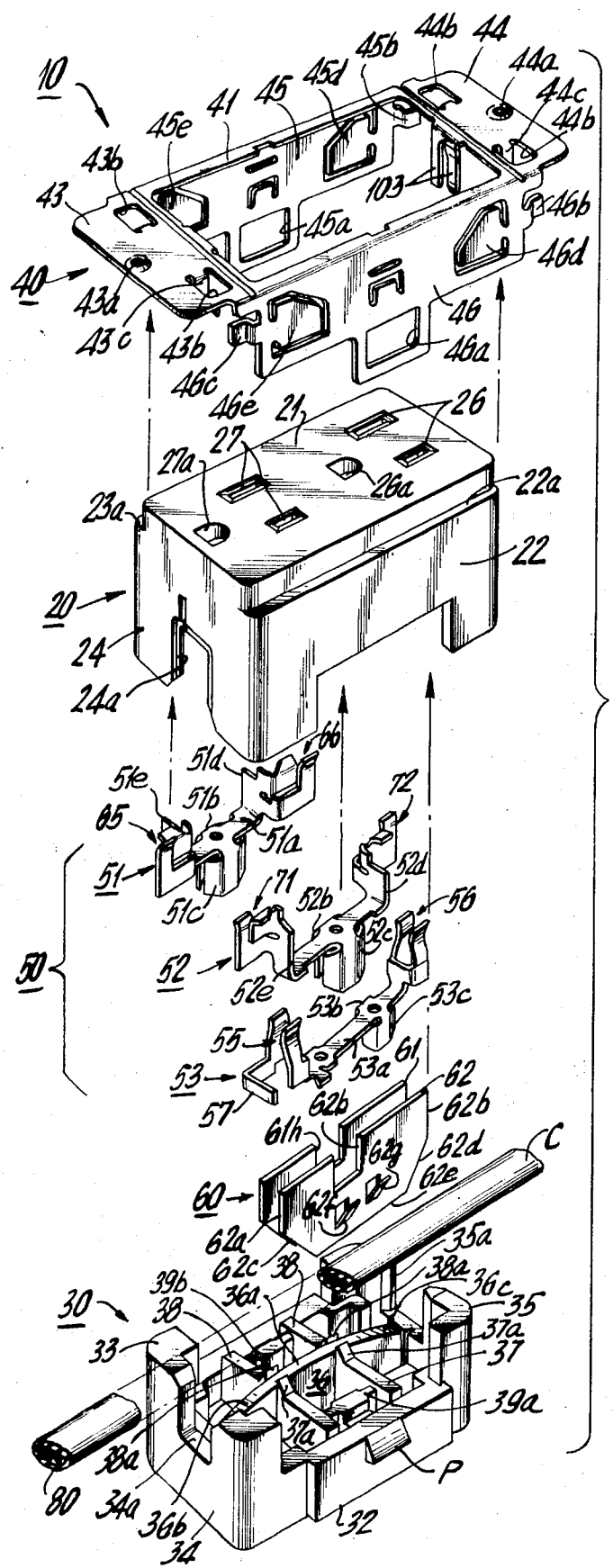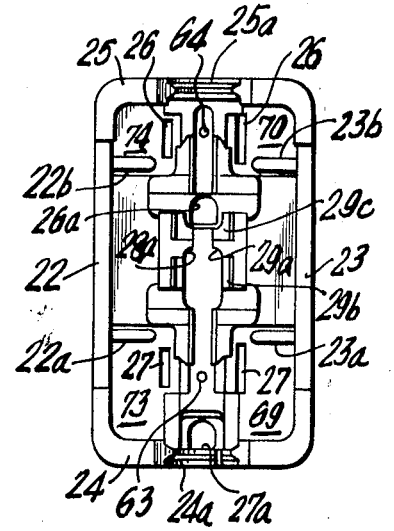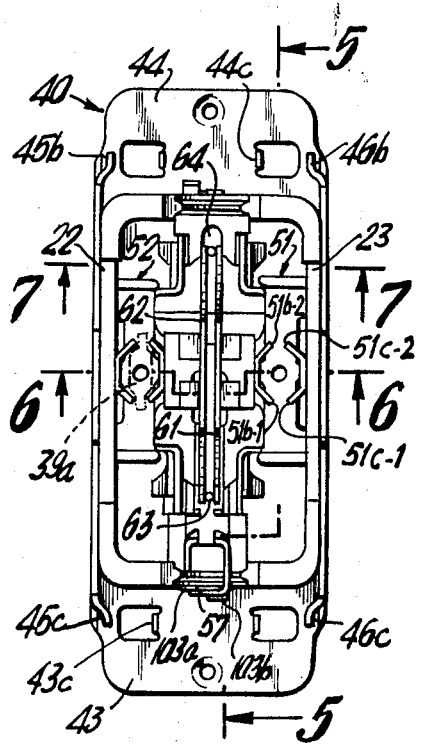

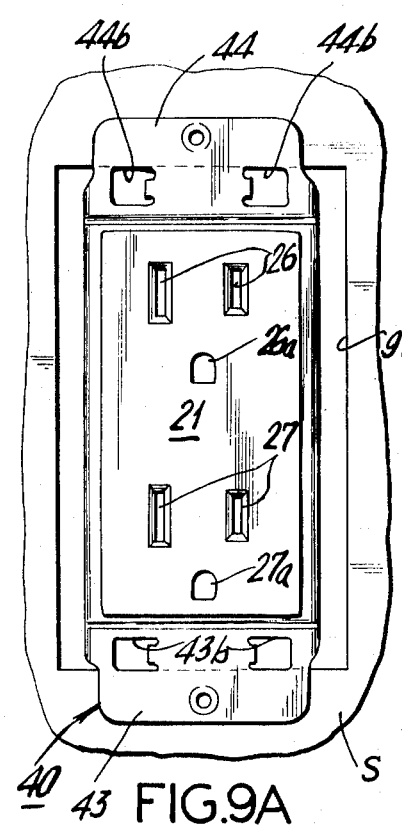
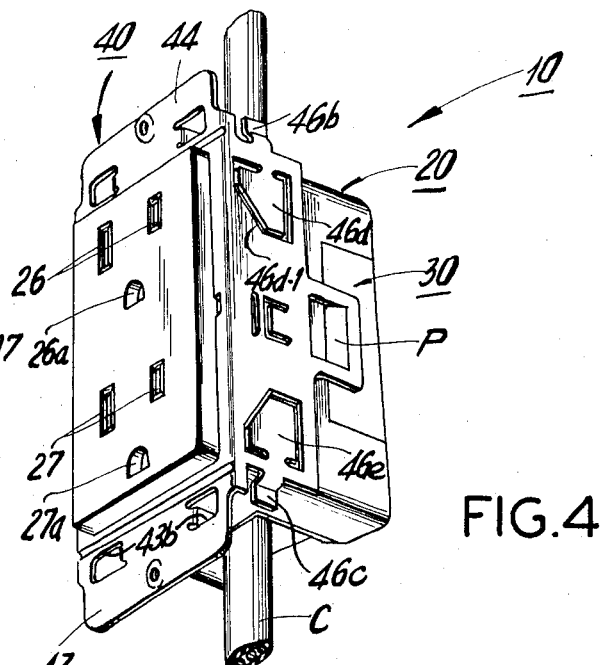
FIG.4
FIG.9A
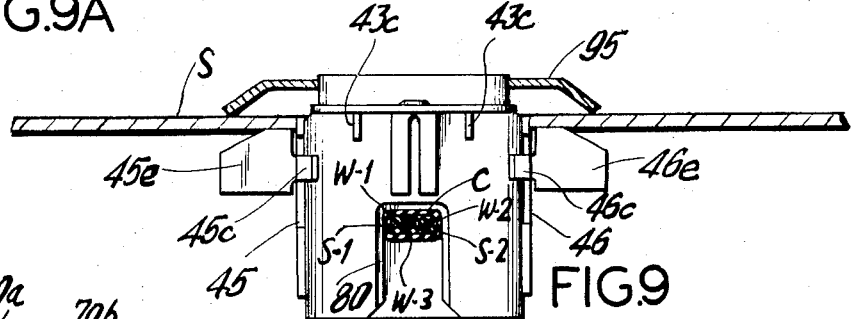
FIG.9
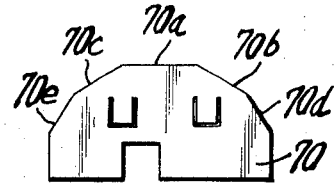
FIG.11
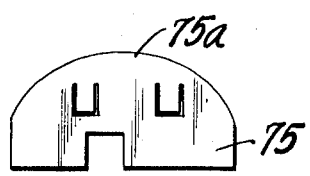
FIG.12
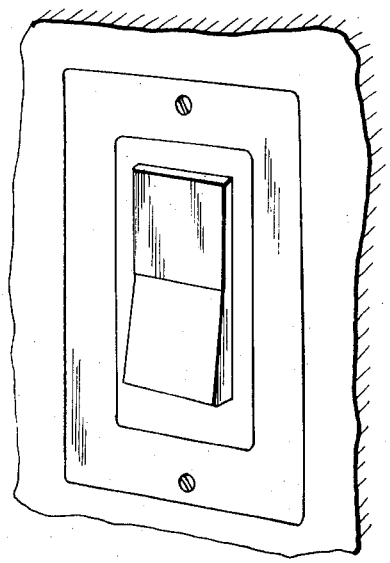
FIG.10

BOXLESS ELECTRICAL COMPONENT

BACKGROUND AND OBJECTS OF THE INVENTION

1. Field of the Invention

The present invention relates to electrical components and more particularly to electrical components such as receptacles which may be connected to multi-conductor insulated cable without the need for any preparation whatsoever of the cable prior to effecting the electrical connection between the cable and the receptacle.

2. Description of the Prior Art

It is typical to provide electrical receptacles in commercial, industrial and private home applications with such receptacles being characterized as those employed to receive electrical power cords, to provide fuse protection for power circuits and to provide for electrical switching of lights and other electrically energizable equipment.

Such receptacles are conventionally housed within a metallic or plastic box and contain terminals for electrical connection to insulated wires coupling the receptacles to the source of power. Such electrical connections are conventionally made by stripping the insulation from the conductor wires, wrapping the bare wires about the terminal posts provided in the receptacle and securing the wires to the terminal posts, usually by means of screw fasteners or soldering. Installation of the box, the receptacle and the wire connections are time-consuming activities which have led to the development of components capable of reducing both the time and cost of such installations.

One approach which has been developed is the "boxless" receptacle technique, in which the need for a receptacle box has been eliminated and in which the receptacle is so designed as to eliminate the need for stripping the insulation from the wire conductors. The boxless receptacle is comprised of a receptacle body and cooperating receptacle cap which are adapted to receive a sheathed cable carrying a plurality of wire conductors and to press-fit the insulated wire conductors and a bare ground wire into intimate electrical contact with conductive elements to establish good electrical engagement between the wires of the cable and the conducting elements, and which are further arranged to provide electrical connection between the conductor wires of the cable and receptacle portions adapted to receive power cord plugs or electrical switches or fuse sockets, as the case may be.

The aforementioned "boxless" receptacles eliminate the need for severing the cable, stripping the insulated wires of the cable and fastening the ends of these wires to terminal posts, so as to significantly reduce assembly and installation time.

However, boxless receptacles of the above-mentioned type still require initial preparation of the cable. Thus, a portion of the insulating sheath of the cable is required to be slit and the individual wires must be spread apart to allow the cable to be properly positioned within the boxless receptacle in order to effect the electrical connection between the receptacle terminals and the cable wires. This operation alone is tedious and time consuming and requires special tools in order to properly prepare the cable for installation into the receptacle.

A further disadvantage of using a separate tool for slicing and spreading the electrical cable is that it introduces the possibility of nicking the conductor wire at locations other than where contact between the wire and receptacle terminal is made. Such nicking tends to result in a breaking of the wire. This disadvantage is completely eliminated by the instant invention.

3. Objects of the Invention

It is therefore an object of the present invention to provide a novel receptacle or other electrical component of the boxless type in which the electrical connections with a sheathed electrical cable carrying a plurality of individually insulated wire conductors and a bare ground wire are completed in a single one-step process.

Another object of the present invention is to provide a novel receptacle or other electrical component of the boxless type which is provided with cutting means, spreading means and connection means which perform the functions of cutting the sheathed cable, spreading the cable so as to urge the individual cable wires into three separate spaced channels and establishing firm electrical connections between each of the cable wires and the associated terminal contacts in a simple one-step operation in which the receptacle or component body and receptacle or component cap are pressed together.

A further object of the present invention is to provide a novel receptacle or other electrical component of the boxless type in which the need for treating the sheathed cable inserted therein preparatory to its insertion into the receptacle is eliminated.

Objects and advantages of the invention are set forth in part herein and in part will be obvious herefrom, or may be learned by practice with the invention, the same being realized and attained by means of the instrumentalities and combinations pointed out in the appended claims.

SUMMARY OF THE INVENTION

The present invention is characterized by providing a receptacle of the boxless type in which the need for initially preparing the sheathed electrical cable for installation into the receptacle and hence the need for special tools for slitting the cable sheath and spreading apart the individual conductor wires, is totally eliminated so as to further simplify the handling and installation of such a receptacle.

The receptacle of the present invention as preferably embodied comprises a body portion and a cap portion which is adapted to be telescopically received within the body portion and to be permanently secured thereto by means of a mounting bracket which encases the body portion and snap-fits over cooperating projections provided along the exterior walls of the cap portion.

The receptacle body preferably contains a pair of cutting members, a pair of diagonal walls and electrical terminals arranged in three spaced parallel compartments. The receptacle cap is provided with projections extending toward the interior of the receptacle body adapted to urge the sheathed electrical cable against the cutting members and to separate the three wires of the cable and press them into their associated channels and finally to urge the wires into their associated terminal contact members. The terminal contact members receiving the individually insulated conductor wires cut through the insulation and make firm and intimate contact with the conductor wires to establish electrical connection.

All of the operations set forth hereinabove are completed in the time required to press the receptacle cap portion into the receptacle body, thus totally eliminating any need for preliminary preparation of the cable before insertion into the receptacle, thus enabling the entire assembly to be completed in one operating step.

It will be understood that the foregoing general description and the following detailed description as well are exemplary and explanatory of the invention but are not restrictive thereof.

The accompanying drawings, referred to herein and constituting a part hereof, illustrate a preferred embodiment of the invention, and together with the description, serve to explain the principles of the invention.

BRIEF DESCRIPTION OF THE DRAWINGS

FIG. 1 is an exploded perspective view of a boxless receptacle embodying the principles of the present invention;

FIG. 2 is a top plan view of the receptacle body portion of FIG. 1 with the terminal contact members, mounting bracket and cutting members removed;

FIG. 3 is a top plan view of the receptacle body portion of FIG. 1, showing the terminal contacts, mounting bracket and cutting members mounted thereto;

FIG. 4 is a perspective view of the fully assembled boxless receptacle and mounting bracket shown in FIG. 1;

FIG. 9 is an end view of a fully assembled receptacle of the type shown, for example, in FIG. 4 and the manner in which it is mounted to a vertical support;

FIG. 9a is a top plan view of a boxless receptacle showing the manner in which the receptacle is mounted to a supporting surface;

FIG. 10 is a perspective view of a boxless switch embodying the principles and design of the present invention;

FIG. 11 is a side view of a first alternate embodiment of a cutting member constructed in accordance with the invention; and FIG. 12 is a side view of a second alternate embodiment of a cutting member constructed in accordance with the invention.

DESCRIPTION OF THE PREFERRED EMBODIMENT

Figure 8:
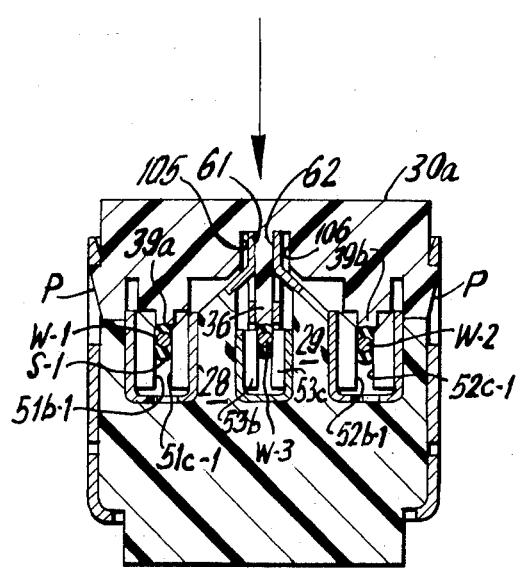
FIG. 8 is a sectional view similar to FIG. 6, but further showing a sectional view of the receptacle cap when fully assembled with the receptacle body, whereby the individual conductor wires of the electrical cable are electrically connected to the receptacle terminal contact members.
Figure 5:
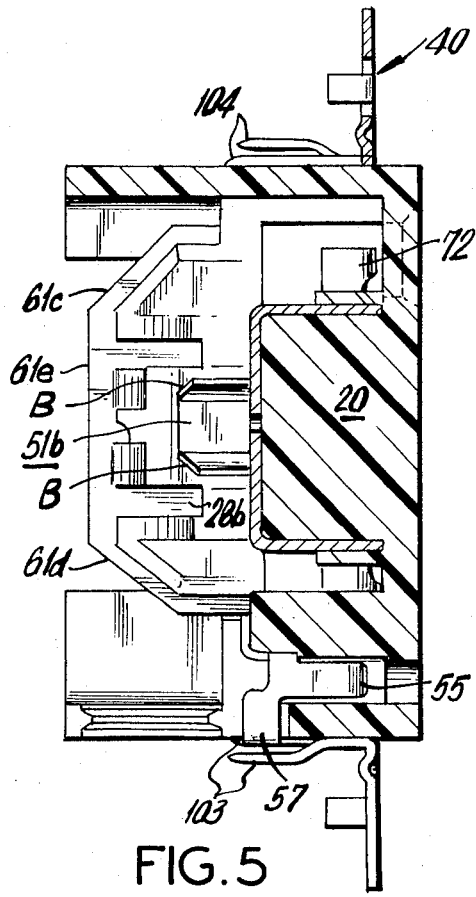
FIG. 5 is a sectional view of the receptacle body portion, taken along line 5—5 of FIG. 3.
Figure 7:
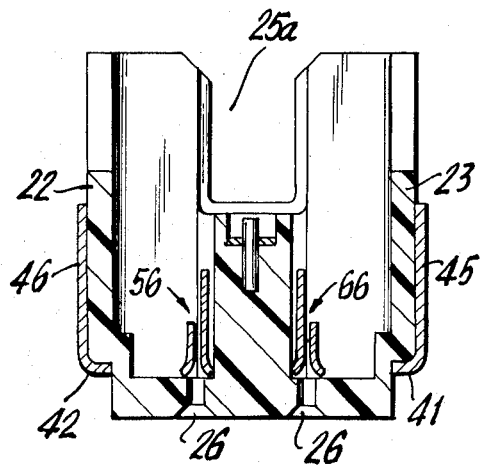
FIG. 7 is a sectional view of the receptacle body portion, taken along line 7—7 of FIG. 3.

Referring now more particularly to the accompanying drawings, there is illustrated, as a preferred embodiment of my invention, a boxless receptacle 10, shown best in FIGS. 1 and 4. Receptacle 10 is comprised of a receptacle body 20, receptacle cap 30, mounting bracket 40, terminal contacts 50, and cutting members 60. The terminal contacts 50 and cutting members 60 are adapted to be received within appropriate grooves formed in the receptacle body 20. Cap 30 is adapted to be telescopically received within the interior of receptacle body 20 and to be snapfittingly locked within mounting bracket 40, as will be more fully described hereinafter.

In accordance with my invention, receptacle body 20, as shown best in FIGS. 2-8, is comprised of a one-piece molded, or otherwise machined, member having a face portion 21 and integrally joined side walls 22 and 23 and end walls 24 and 25. The face 21 is provided with first and second pairs of openings 26 and 27, respectively, which are so configured and spaced as to receive a pair of conductive blades of a power cord plug.

Additional openings 26a and 27a are provided in face 21 and are adapted to receive the pin-shaped conductive member of a three-wire power cord plug conveniently employed with equipment either having or requiring a grounded connection.

All of the openings 26, 27, 26a and 27a extend through the face 21 and into the interior of the receptacle body 20.

Considering especially FIGS. 2 and 5-8, the interior of receptacle body 20 is provided with a pair of upwardly extending projections 28 and 29 which have their opposing faces spaced apart to define a centrally located channel 31 which is aligned with a pair of slots 24a and 25a in end walls 24 and 25, respectively, for a purpose to be more fully described hereinafter. The channel 31 is aligned with openings 26a and 27a and is further adapted to receive contact member 53 as well as the pair of cutting members 60.

Projection 29 and side wall 22 cooperate to form a second channel 31a adapted to receive contact 52. Projection 28 cooperates with side wall 23 to form channel 31b adapted to receive contact 51. All of the metallic elements 50 and 60 are designed to be somewhat force-fittingly received within receptacle body 20 so as to retain their position therein without the need for any additional fastening members or adhesive.

The contacts 51 and 52 each have a pair of vertically aligned edges 51d–51e and 52d–52e which are received by vertically aligned grooves 22a–22b and 23a–23b provided along the interior surfaces of side walls 22 and 23, respectively, to properly position contacts 51 and 52 within the receptacle body 20.

The centrally mounted contact 53 is comprised of an elongated body portion 53a having a pair of centrally located projections 53b and 53c extending at right angles to body portion 53a. The sides of these projections are bent inwardly so as to define a substantially hexagonal shape configuration. Since the projections 53b and 53c of contact member 53 are substantially identical to the corresponding portions of contacts 51 and 52, reference will be made to the corresponding elements of contact 51, for example, in order to better understand the structural arrangement so provided.

Noting especially FIGS. 1 and 3, contact 51 comprises a body portion 51a having a pair of projections 51b and 51c bent at right angles to body portion 51a and further having their end portions bent so as to form the substantially hexagonal shaped contour, shown best in FIG. 3, wherein the edges 51c-1 and 51c-2 are positioned in close proximity to the edges 51b-1 and 51b-2 of projection 51b to form cooperating pairs of cutting edges which are adapted to receive an insulated wire therebetween, sever the insulating sleeve and make firm electrical engagement with opposite sides of the wire within the insulating sleeve. This arrangement is shown best in FIG. 8 wherein the adjacently positioned cutting edges 51b-1 and 51c-1 are shown as having severed through the insulating sleeve S-1 of wire W-1 and in which the cutting edges make firm electrical contact with the wire itself.

All of the terminal contact members 51–53 are preferably formed of a resilient brass material so as to provide some "give" as the wire is pressed between the pairs of cutting edges. The cutting edges are bevelled at their upper ends (relative to FIGS. 6 and 8, for example,) to provide a tapering guideway for receiving their respective wires. Note, for example, the bevelled corners B provided at the upper end of cutting edges 51b-1 and 51c-1 of contact 51 shown in FIGS. 5 and 6. It will be understood that the corresponding cutting projections of the remaining contacts 52 and 53 are designed in a similar fashion.

The inwardly facing side walls of projections 28 and 29 which define the centrally located channel 31 advantageously are provided with a pair of cooperating recesses 28a and 29a providing clearance for the inwardly extending cutting edges of projections 53b and 53c and also to provide support for the back walls of the projections 53b and 53c within channel 31.

Contact 53 is further provided with first and second pairs of upwardly extending projections 55 and 56 which are bent toward one another intermediate their ends which taper away from one another at their free end to define a pair of cooperating conductive prongs which are adapted to make electrical engagement with the grounded pin-shaped projections of a power cord plug. These pairs of projections 55 and 56 are adapted to extend into the openings 27a and 26a, respectively, so as to make good wiping engagement with the pin-shaped grounded conducting projection of the power cord.

One end of contact 53 is provided with an ear 57 which is adapted to extend beyond the edge of end wall 25 defined by the base of slot 25a (see FIGS. 1 and 3). The ear 57 is adapted to be positioned between a pair of prongs 103a–103b to electrically ground the mounting bracket. A similar pair of prongs 104a–104b is provided at the opposite end of bracket 40 since the bracket 40 is symmetrical in design.

As here preferably embodied, the cutting assembly 60 is comprised of first and second cutting members 61 and 62. Since these members are substantially identical in configuration and function, only one will be described herein for purposes of simplicity. As can best be seen from FIGS. 1, 5, 6 and 8, cutting member 62 is preferably formed from a flat sheet of steel whose side edges 62a and 62b are tapered at 62c and 62d, respectively, to form diagonal cutting edge portions which join the side edges 62a and 62b to a top cutting edge 62e. A pair of ears 62f and 62g are bent diagonally outwardly from the main body of the cutting member. These ears are adapted to be received in a pair of shallow recesses 29b and 29c provided in the sloping surface of projection 29 to seat the ears 62f and 62g, respectively, so as to properly position blade 62 within centrally located channel 31. The main portion of blade 62 rests along the interior wall of projection 29. Blade 61 is inserted and positioned in a similar fashion. A pair of pin-shaped projections 63 and 64 integrally formed with and extending upwardly from the receptacle body 20 serve as means for maintaining the blades 61 and 62 in spaced parallel fashion, as can best be seen in FIG. 3. The blades 61 and 62 are each provided with slots 61h and 62h, respectively, to provide clearance for the inwardly extending cutting edges of projections 53b and 53c of contact 53.

FIGS. 11 and 12 illustrate alternate embodiments of the cutting edge portions for the cutting members 61, 62. Thus, in FIG. 11 there is illustrated a cutting member 70 having a narrower top cutting 70a and a pair of varying diagonal cutting portions 70b, 70c and 70d, 70e, respectively. FIG. 12 illustrates a cutting member 75 whose cutting edge portion 75a comprises an arcuate member. It will be understood that the remaining portions of cutting members 70 and 75 each are identical to that shown for members 61, 62. It will be seen that each of the cutting edge portions of members 70 and 75 serve to reduce the area of cable sheath 80 that needs to be severed at any given time, thereby reducing the force required for slicing the sheath and ensuring an accurate cut between the cable wires.

Figure 6:
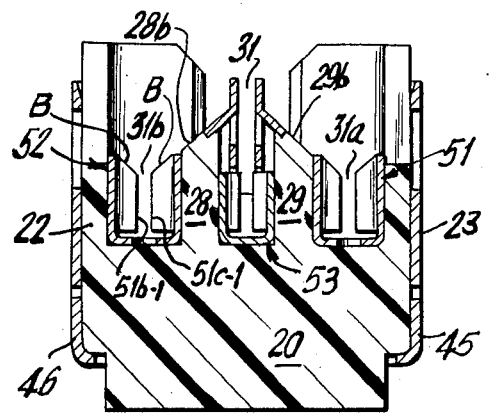
FIG. 6 is a sectional view of the receptacle body portion, taken along line 6—6 of FIG. 3.

The contacts 51 and 52 are respectively inserted within channels 31b and 31a, as shown, for example, in FIGS. 6 and 8. The free ends of the contact body 51a are bent or otherwise machined to form first and second pairs of cooperating contact jaws 65 and 66, each pair adapted to receive one conductive blade of a power cord plug. These jaws enter into hollowed out depressions 69 and 70 provided in receptacle body 20 (see FIG. 2) and are aligned to be positioned immediately beneath one of each of the two pairs of openings 26 and 27, respectively, which receive the conductive blades of power cord plugs. The contact 52 is similarly designed to have a first and second pair of jaws 71 and 72, respectively, at its free ends which are arranged within depressions 73 and 74 in receptacle body 20 so as to be aligned immediately beneath the remaining openings in the opening pairs 26 and 27.

In accordance with the invention receptacle cap 30 is comprised of a rear face 30a (note especially FIG. 8) having integrally formed side walls 32 and 33 and end walls 34 and 35. End walls 34 and 35 are provided with slots 34a and 35a, respectively, which cooperate with the slots 25a and 24a, respectively, in receptacle body 20 to define an opening for receiving the sheathed cable C, the latter being more fully described hereinafter.

The interior of receptacle cap 30 is provided with a centrally located projection 36 extending parallel to the longitudinal axis thereof. The center portion 36a of the top edge of projection 36 is substantially flat while the portions 36b and 36c of the top edge are bevelled as shown best in FIG. 1 so as to form a generally arcuate shape. Two pairs of projections 37 and 38 extend in a direction perpendicular to projection 36 and each projection of the pair is arranged in spaced parallel fashion relative to its remaining projection. The projections 37, 38 are provided with diagonally aligned portions 37a and 38a, respectively, which serve to spread the outer wires of cable C during the assembly operation in a manner to be more fully described hereinafter. The inner free edges of projections 37 and 38 are spaced from projection 36 to provide channels 105 and 106 for receiving cutting members 61 and 62, more fully described hereinbelow.

The interior of the receptacle cap 30 is provided with two additional projections 39a and 39b which function to drive the insulated wires into the receiving cutting terminals in a manner more fully described hereinafter.

In accordance with the invention, a mounting bracket member 40 is provided for securing the receptacle body and cap members together and for mounting the receptacle unit for use. As here preferably embodied, the receptacle body 20 is provided along side walls 22 and 23 with a pair of shoulders 22a and 23a which serve to support the elongated marginal lips 41 and 42 of mounting bracket 40. Mounting bracket 40 has two outwardly extending ends 43 and 44 each provided with a tapped opening 43a and 44a, respectively, for receiving threaded fasteners (not shown) for mounting a conventional receptacle cover plate thereto. Two downwardly depending side walls 45 and 46 are arranged in spaced parallel fashion to one another and at right angles to the marginal lips 41 and 42. Each of these side walls is provided with a rectangular shaped opening 45a and 46a, respectively, for cooperating with a pair of projections P provided along the outer surface of side walls 32 and 33 of receptacle cap 30 to securely fasten the elements 20, 30 and 40, together, in a manner to be more fully described.

Each of the side walls 45 and 46 are further provided with small tabs 45b–45c and 46b–46c, respectively, designed to be bent inwardly to rest against the end walls 24 and 25 of receptacle body 20. When these tabs are bent inwardly, cooperating tabs 45d–45e and 46d–46e are caused to be bent outwardly to serve as means for abutting against a supporting surface for securely mounting the receptacle in place, in a manner to be more fully described.

The sheathed electrical cable which the receptacle 10 is designed to receive is shown at C in FIGS. 1 and 9, and typically comprises an outer insulating sleeve 80 surrounding a pair of insulated wires W-1 and W-2 which are arranged on either side of a typically bare central wire W-3. Each of the wires W-1 and W-2 are individually surrounded by insulating sleeves S-1 and S-2, respectively. Such a typical cable construction is commercially available from the Rome Cable Division of Cyprus Mines, Rome, New York, under the tradename "Romex."

The manner in which the receptacle components and sheathed cable C are assembled is as follows:

The sheathed cable C is positioned upon receptacle cap 30 so that it extends through slots 34a and 35a in the receptacle cap end walls. In this position the cap is lowered into the receptacle body 20. It should be noted that the outer perimeter of the receptacle cap as defined by the side walls 32–33 and end walls 34–35 is slightly smaller than the interior perimeter defined by the interior surfaces of the receptacle body side walls 22–23 and end walls 24–25 so that the end cap is telescopically received within the receptacle body 20. It should be further noted that the design of the end cap and receptacle body is such that it is not possible to insert the end cap into the receptacle body incorrectly due to their cooperative asymmetrical configurations.

As the end cap 30 is pressed into the receptacle body 20 the flat edge 36a of projection 36 presses against the central portion of cable C while the pointed edges of pairs of projections 37 and 38 press into the insulating sleeve 80 which serves as the outer sheath of cable C. The electrical cable is thus pressed into the cutting edges 61e and 62e of cutting blades 61 and 62, which sever the cable sheath 80 so as to form slits or cuts between wire W-1 and wire W-3 and between W-2 and wire W-3. The slits are initially the length of the cutting edge portions 61e, 62e and are thereafter gradually enlarged due to the bevelled cutting edge portions 61c, 61d and 62c, 62d of the respective cutting blades. Similarly, where cutting member 70 is employed, the slit is initially the length of cutting edge 70a and gradually enlarges as the cable is forced onto the bevelled edge portions 70b–70e. Where cutting member 75 is employed, the slit continuously gradually enlarges as the cable is forced onto the entire arcuate cutting edge 70a.

The bevelled portions 37a, 38a, as well as the flat portions, of projection pairs 37 and 38 in end cap 30 cooperate with the bevelled surfaces 28b and 29b of projections 28 and 29 in receptacle body 20 to spread the wires W-1 and W-2 away from central wire W-3 and to direct the spread wires W-1 and W-2 toward the channels 31a and 31b provided in the receptacle body 20, respectively.

The flat surface portion 36a of projection 36 in end cap 30 serves as a backing member for the center wire W-3 and serves to drive the center wire W-3 between blades 61 and 62 and downwardly between the cutting edges of the projections 53b and 53c provided in contact 53. This can best be seen in FIG. 8 wherein the projection 36 has urged the center wire W-3 between the cutting edges or projections 53b and 53c.

In a similar fashion, the projections 39a and 39b extending from the interior surface of end cap 30 respectively press wires W-1 and W-2, which are covered with insulating sleeves S-1 and S-2, into the projections 51b, 51c and 52b, 52c of contacts 51 and 52, respectively, so that their insulating sleeves are severed by the cutting edges 51b-1, 51c-1 and 52b-1, 52c-1, respectively, of these projections and further so that the cutting edges make good electrical engagement with the conductors W-1 and W-2 as shown best in FIG. 8. One such projection 39a is shown in dotted fashion in FIG. 3 and its shape can be seen to conform to the configuration of projections 52b and 52c of contact 52 so as to at least partially enter into the upper end of the opening defined by these projections. The projection 39b similarly conforms to the configuration of projections 51b and 51c of contact 51 so as to partially enter into the opening defined by these two projections in a similar fashion. The narrow channels 105 and 106 receive the upper ends of the cutting blades 61 and 62 as the cap 30 and receptacle body are pressed together (see FIG. 8).

The cooperating slots 25a, 34a and 24a, 35a in the end walls of the receptacle body 20 and end cap 30 respectively, cooperate to encircle the ends of cable C projecting outwardly from the assembled receptacle in the manner shown best in FIGS. 1 and 9.

The free ends of the tabs which define openings 45a and 46a of mounting bracket 40 slide outwardly along the bevelled edges of projections P in end cap 30 (see FIG. 8) until the openings clear the ends of the tapered projections P at which time the flaps 45 and 46 "snap" into position against the side walls of end cap 30 so as to lockingly engage the bevelled projections P as shown in FIG. 8. The marginal lips 41 and 42 and shoulders 22a and 23a cooperate with the locking projections P and rectangular openings 45a and 46a to firmly secure end cap 30 and receptacle body 20 to one another.

It can thus be seen that, by simply pressing end cap 30 into receptacle body 20 with the electrical cable C appropriately positioned, it is possible to complete the entire assembly in a one-step operation.

Finally, it will be seen that a pair of parallel openings 43b and 44b are formed at the opposite ends of mounting bracket 40, advantageously by stamping and bending out a portion of the bracket so as to form corresponding pairs of depending legs 43c and 44c, respectively. These legs advantageously serve as stops for facilitating the location of the bracket and receptacle unit in a wall opening.

The assembled receptacle advantageously may be mounted within an opening in a vertical side wall S, as shown at 97 in FIGS. 9 and 9a, in the following manner:

Mounting bracket 40, having the receptacle body 20 and cap 30 secured thereto with cable C electrically connected and firmly held between body 20 and cap 30, is placed within opening 97 so that the openings 43b, 44b and stops 43c, 44c lie within opening 97 while the ends 43, 44 of mounting bracket 40 overlie opening 97 to prevent further movement of the receptacle through the opening (see FIG. 9a). A slender portion of a tool such as, for example, a screwdriver, may then be placed through openings 43b, 44b, so as to gain access to the tabs 46b, 46c and 45b, 45c, and these tabs may be bent toward the end walls of the receptacle body 20 so as to move the projections 46d, 46e and 45d, 45e at right angles to the receptacle body side walls to occupy the position shown, for example, in FIG. 9. Thus, tabs 45b, 45c and 46b, 46c cooperate with the bracket ends 43, 44 to secure the boxless receptacle to a supporting side wall S.

Advantageously, each of tabs 45d, 45e and 46d, 46e has a tapered edge such as shown, for example, at 46d-1 to accommodate supporting walls S of varying thickness and to provide a wedge fit for secure mounting of the receptacle to the wall.

Thereafter, a cover plate 95 is positioned on the side of vertical side wall S so as to cover the opening in the manner shown in FIG. 9. Plate 95 has a pair of openings provided therein to cooperate with the tapped openings 43a and 44a (see FIG. 1) to receive threaded fasteners which secure the plate 95 to the mounted receptacle.

Although the boxless receptacle of the present invention has been described as being capable of being mounted to vertical side walls, it should be understood that any other supporting wall at any angular orientation may be fitted to receive the boxless receptacle of the present invention.

It will be apparent from the foregoing that the embodiment of FIGS. 1–9 shows in detail a boxless receptacle adapted to provide a pair of plug-in sockets for receiving power cord plugs. It should be understood that the receptacle may be changed in design in a way obvious to those with ordinary skill in the art so as to adapt the boxless receptacle to provide and perform a wall switch function, such as the wall switch arrangement shown in FIG. 10. Without any alteration or departure in the receptacle design described herein the contacts of the receptacle need only be electrically connected to a typical wall switch structure which would occupy the region otherwise occupied by the plug-in openings. Obviously the receptacle may be further modified to provide a fuse receptacle for receiving a circuit protecting fuse member. Also it may be modified for any one of the numerous conventional configurations of receptacles other than the configuration shown herein. It will thus be seen that the principles of the present invention may be utilized in any electrical component required to make electrical connection to insulated wire conductors.

Also, it will be apparent that a receptacle constructed in accordance with the present invention may be used for all conductors, such as, for example, copper, aluminum and aluminum coated with indium. Since the possibility of nicking is eliminated with the receptacle of the instant invention, it is particularly advantageous for use with aluminum conductor wires, since aluminum wire is particularly susceptible to breakage from nicks.

Whereas the preferred embodiment described herein shows means for severing a three-wire sheathed electrical cable, it will also be understood that with obvious and minor design modifications, the receptacle of the present invention may be altered to receive and be connected to a two-wire cable. In such an embodiment, cable of the type shown in FIG. 9 and of similar design except for the elimination of wire W-3 may be placed in the receptacle end cap in a similar fashion. For receptacles receiving two-wire cable, the center channel may be eliminated and one of the blades 61 and 62 may be eliminated while the remaining blade is centrally positioned in the center channel. Projections 28 and 29 would then be placed so as to provide only a very thin channel for receiving a single blade which would sever the insulating sleeve 80 along its longitudinal axis. The sloping side walls of projections 28 and 29 would then cooperate with the sloping portions of projection pairs 37 and 38 to spread the wires W-1 and W-2 apart and drive them into electrical engagement with the contacts 51 and 52, contact 53 being eliminated in such two-wire cable applications.

Similarly, where a four-wire sheathed electrical cable is employed, it will be understood that the receptacle would be constructed so as to have two structures side-by-side, each structure being identical to that described immediately above for use with a two-wire cable.

Although there has been described a preferred embodiment of this invention, many variations and modifications will now be apparent to those skilled in the art. Therefore, this invention is to be limited, not by the specific disclosure herein, but only by the appended claims.

What is claimed is:

1. An electrical component adapted to be electrically connected to a plural-wire cable including individually insulated conductor wires covered by an insulating sheath while eliminating the need for stripping or preliminary preparation of the cable or conductor wires in any way prior to assembly of the component and the cable, said component comprising:
   a body portion having a front face and integrally joined walls defining an open-ended hollow interior;
   a cap portion having a rear face and integrally joined walls defining an open-ended hollow interior, said cap walls and said body walls being adapted to be telescopically slidably received within each other so as to cooperatively define a hollow, substantially fully enclosed component housing;
   said body portion having first cutting means aligned along the longitudinal axis of said component, said first cutting means having at least one cutting edge projecting toward said cap portion in assembly;

said cap portion having first elongated projection means aligned along the longitudinal axis of said component and extending toward said body portion in assembly;

said body walls and said cap walls each being provided with first and second end slots aligned along said longitudinal axis and adapted to receive and surround a substantially straight portion of said cable and to align said cable along said longitudinal axis;

first and second conductive contact means positioned on opposite sides of said cutting means in said body, each of said first and second conductive contact means including cutting means integral therewith;

said body portion further including a pair of sloping separating walls positioned between said first cutting means and each of said first and second conductive contact means;

said cap portion including second projection means extending transversely to said first elongated projection means;

said first elongated longitudinal projection means of said cap adapted to urge said cable into engagement with said first cutting means to thereby sever said cable sheath along its longitudinal axis and said second transverse projection means of said cap adapted to cause the severed conductor wires in said cable to move along said sloping separating walls of said body portion to thereby spread said conductor wires apart and move them toward and into engagement with said first and second conductive contact means as said cap and body are pressed together during assembly, said cutting means integral with each of said first and second conductive contact means cutting through said individual conductor wire insulation upon engagement therewith to establish electrical connection with said conductive contact means and said conductor wires.

2. A component as claimed in claim 1, wherein said body portion is provided with openings for removably receiving the conductive blades of a power cord plug; and said first and second electrical contacts each include means for electrically engaging respective blades of said power cord plug when inserted into said openings.

3. A component as claimed in claim 1, further comprising a mounting bracket having an opening which embraces the side walls of the component body portion;

said component body portion having a pair of shoulders for engaging associated marginal portions of said mounting bracket opening;

said mounting bracket including a pair of downwardly extending flanges engaging associated side walls of said component;

each of said flanges including an opening therein; and said component cap portion having a pair of projections located on opposite outer side walls and positioned so as to extend through said openings in said mounting bracket flanges when said cap and said body are fully assembled to thereby secure said cap to said body.

4. A component as claimed in claim 1, wherein said cap portion includes a narrow channel means adjacent said first elongated longitudinal projection means for receiving said cutting means upon assembly of said cap and body portions.

5. A component as claimed in claim 1, wherein said second transverse projection means of said cap portion extends from the outer side walls thereof into closely spaced relationship with said first elongated longitudinal projection means, and has sloped portions immediately adjacent the ends spaced from said first elongated longitudinal projection means.

6. A component as claimed in claim 1, wherein each of said first and second conductive contact means includes a pair of spaced conductive fingers; and said cutting means integral with said first and second conductive contact means comprises spaced cutting edges provided on each of said conductive fingers.

7. A component as claimed in claim 1, wherein said plural-wire cable is a three-wire cable comprised of two outer individually insulated conductor wires and a center ground wire;

said first cutting means comprises first and second cutting blades aligned in closed spaced parallel fashion along the longitudinal axis of said component, each of said cutting blades having a cutting edge projecting toward said cap portion in assembly; and including third conductive contact means positioned between said first and second cutting blades in said body portion, said third conductive contact means including cutting means integral therewith;

whereby, upon assembly of said cap and body portions about said cable, said first elongated longitudinal projection means of said cap urges said cable into engagement with the cutting edges of said first and second cutting blades to thereby sever said cable along its longitudinal axis between each of said outer conductor wires and said center ground wire and further urges said center ground wire into engagement with said third conductive contact means, said cutting means integral with said third conductive contact means establishing electrical connection with said ground wire;

said second transverse projection means of said cap and said sloping separating walls of said body cooperate to spread the severed conductor wires and move them toward and into engagement with said respective first and second conductive contact means, said cutting means integral with each of said first and second conductive contact means cutting through said individual conductor wire insulation upon engagement therewith to establish electrical connection with said conductive contact means and said conductor wires.

8. A component as claimed in claim 3, wherein said mounting bracket flanges are each provided with a pair of generally C-shaped slots each positioned adjacent opposite edges of said flanges, each said generally C-shaped slot defining a movable tab; and each of said edges having an outwardly extending ear positioned adjacent each said generally C-shaped slot and adapted to be bent toward the body of said component to thereby move its associated movable tab away from the wall of said component.

9. A component as claimed in claim 6, wherein said cap portion includes a pair of longitudinally extending projection means spaced in alignment on opposite sides of said first elongated longitudinal projection means and adapted to register with said spaced conductive fingers of each of said first and second conductive contact means when said cap and said body are in assembled relationship, whereby the aforesaid spaced longitudinal pair of projection means urge the severed and spread apart conductor wires of said cable between said spaced conductive fingers of each of said conductive contact means and into engagement with said spaced cutting edges of said conductive fingers when said cap and said body are in assembly.

10. A component as claimed in claim 7, wherein said body portion is provided with openings for removably receiving the conductive blades and grounding pin of a power cord plug;

said first and second conductive contact means each include means for electrically engaging respective conductive blades of said power cord plug when inserted into said openings; and said third conductive contact means includes means for electrically engaging said grounding pin of said power cord plug.

11. An electrical component adapted to be electrically connected to a plural-wire cable including individually insulated conductor wires covered by an insulating sheath while eliminating the need for stripping or preliminary preparation of the cable or conductor wires in any way prior to assembly of the component and the cable, said component comprising:

a first body portion having a front face and side walls defining an open-ended hollow interior;

a second body portion having a rear face and side walls defining an open-ended hollow interior, said side walls of said first and second body portions adapted to be telescopically slidably received within each other so as to cooperatively define a hollow, substantially fully enclosed component housing;

respectively opposed side walls of said first and second body portions each having opposed end slots aligned along the longitudinal axis of said component adapted to receive and surround a substantially straight portion of said cable and to align said cable along said longitudinal axis of said component;

one of said body portions including cutting means adapted to sever said cable sheath along its longitudinal axis and the other of said body portions including projection means adapted to urge said cable into severing engagement with said cutting means upon assembly of said body portions;

one of said body portions further including conductive contact means having cutting contact means adapted to sever conductor wire insulation adapted to establish electrical connection with each of the wires of said cable; and said body portions further including cooperating projection means adapted to spread apart the severed conductor wires and urge them into electrical connection with said conductive contact means upon assembly of said body portions, whereby said cable is electrically connected to said component simultaneously with the assembly of said first and second body portions to form said component housing about said cable.

* * * * *

UNITED STATES PATENT OFFICE
CERTIFICATE OF CORRECTION

PATENT NO. : 3,860,319
DATED : January 14, 1975
INVENTOR(S) : Thomas S. Slater

It is certified that error appears in the above-identified patent and that said Letters Patent are hereby corrected as shown below:

On the Title Page, insert as "[73]" the following --
Assignee: SLATER ELECTRIC INC., Glen Cove, New York --.

Signed and Sealed this nineteenth Day of August 1975

[SEAL]

Attest:

RUTH C. MASON
Attesting Officer

C. MARSHALL DANN
Commissioner of Patents and Trademarks